United States Patent
Tanaka et al.

(10) Patent No.: US 9,863,088 B2
(45) Date of Patent: Jan. 9, 2018

(54) AIRBAG BASE FABRIC COATING MATERIAL, AIRBAG BASE FABRIC, AND METHOD FOR MANUFACTURING THE SAME

(71) Applicant: TOYODA GOSEI CO., LTD., Kiyosu-shi, Aichi-ken (JP)

(72) Inventors: Koki Tanaka, Kiyosu (JP); Hajime Miwa, Kiyosu (JP); Motoaki Naruse, Kiyosu (JP); Yuh Kimura, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 425 days.

(21) Appl. No.: 14/489,570

(22) Filed: Sep. 18, 2014

(65) Prior Publication Data

US 2015/0093951 A1 Apr. 2, 2015

(30) Foreign Application Priority Data

Sep. 27, 2013 (JP) ................... 2013-202435
Feb. 6, 2014 (JP) ................... 2014-21647
Aug. 8, 2014 (JP) ................... 2014-163128

(51) Int. Cl.
*D06M 15/33* (2006.01)
*D06M 15/333* (2006.01)
(Continued)

(52) U.S. Cl.
CPC ......... *D06M 15/333* (2013.01); *B60R 21/235* (2013.01); *D06M 13/148* (2013.01);
(Continued)

(58) Field of Classification Search
CPC .. D06M 15/33; D06M 15/333; D06M 15/564; D06M 13/148; B60R 21/235; D06N 3/04; D06N 3/14
See application file for complete search history.

(56) References Cited

U.S. PATENT DOCUMENTS 5,705,445 A 1/1998 Chikaraishi et al.
5,800,883 A 9/1998 Koseki
(Continued)

FOREIGN PATENT DOCUMENTS

JP 07-040798 A 2/1995
JP 08-085405 A 4/1996
(Continued)

OTHER PUBLICATIONS

Machine translation of JP 2001-329468. Nov. 2001.*

*Primary Examiner* — John Uselding
(74) *Attorney, Agent, or Firm* — Posz Law Group, PLC

(57) ABSTRACT

A polyvinyl alcohol (PVA)-based airbag base fabric aqueous coating material is described. A blocked polyisocyanate component (B-NCO) and liquid polyol are added to polyvinyl alcohol as a cross-linkage improver and a plasticizer, respectively. The B-NCO is composed of or based on a medium-molecular-weight form as a polyether-modified prepolymer, and used concurrently with a low-molecular-weight form in a small amount. The base fabric coating material is applied on one or both of the sides of a cloth of the base fabric and heated. The acquired coating film is a water-insoluble coat and the coating has excellent heat and moisture resistance (hot water resistance) and flexibility.

26 Claims, 6 Drawing Sheets

(51) Int. Cl.
  *B60R 21/235* (2006.01)
  *D06M 15/564* (2006.01)
  *D06M 13/148* (2006.01)
  *D06M 13/395* (2006.01)
  *D06N 3/04* (2006.01)
  *D06N 3/14* (2006.01)

(52) U.S. Cl.
  CPC ........ *D06M 13/395* (2013.01); *D06M 15/564* (2013.01); *D06N 3/04* (2013.01); *D06N 3/14* (2013.01); *D06N 3/144* (2013.01); *B60R 2021/23514* (2013.01); *B60R 2021/23561* (2013.01); *D06M 2200/12* (2013.01); *D06N 2211/268* (2013.01); *D10B 2505/124* (2013.01); *Y10T 442/2049* (2015.04); *Y10T 442/2213* (2015.04)

(56) References Cited

U.S. PATENT DOCUMENTS

| | | | |
|---|---|---|---|
| 8,142,869 B2 | 3/2012 | Kobayashi et al. | |
| 8,211,813 B2 | 7/2012 | Morimoto et al. | |
| 2014/0113516 A1* | 4/2014 | Tanaka | C08G 18/6212 442/65 |

FOREIGN PATENT DOCUMENTS

| | | | | |
|---|---|---|---|---|
| JP | 2001-214371 A | 8/2001 | | |
| JP | 2001-329468 | * 11/2001 | ............. | B60R 21/26 |
| JP | 2001-329468 A | 11/2001 | | |
| JP | 2004-124321 A | 4/2004 | | |
| JP | 2009-097134 A | 5/2009 | | |
| WO | 2013/047652 A1 | 4/2013 | | |

\* cited by examiner

AIRBAG BASE FABRIC COATING MATERIAL, AIRBAG BASE FABRIC, AND METHOD FOR MANUFACTURING THE SAME

The present application claims priority from Japanese Patent Applications Nos. 2013-202435 of Tanaka et al., filed on Sep. 27, 2013, 2014-21647 of Tanaka et al., filed on Feb. 6, 2014 and 2014-163128 of Tanaka et al., filed on Aug. 8, 2014, the disclosures of which are hereby incorporated into the present application by reference.

BACKGROUND OF THE INVENTION

1. Field of the Invention

The present invention relates to a water-soluble resin-based airbag base fabric coating material, an airbag base fabric, and a method for manufacturing thereof and, in particular, to an airbag base fabric coating material that can form a coating film (coat) having excellent heat and moisture resistance (hydrolysis resistance) and flexibility on an airbag base fabric.

Hereinafter, "parts" in a blending unit will be in a mass unit unless otherwise noted.

2. Description of Related Art

An airbag device for protecting occupants is mounted in a vehicle. For the airbag base fabric incorporated in the airbag device, a cloth composed of (for example, plain-woven) fiber yarns (for example, polyamide fiber and polyester fiber) is used.

The purpose of the airbag is to protect occupants in a vehicle. As a basic performance, the airbag should swell in an instant and have an air shutoff property for securing an air pressure for a sufficient time period (see Lines 5 to 7 in Paragraph of Patent Document 1).

In order to ensure an appropriate breathability (air barrier property) on the airbag base fabric, one or both of the sides of the cloth have been coated with a coat (coating film) of silicon elastomer resin or urethane resin (see Paragraph [0003] of Patent Document 1).

In addition, all of the coating materials of such coating films have been emulsion coating materials (see Abstract of Patent Documents 2 and 3, for example).

However, since preparation of such emulsion coating materials is troublesome and many of the additives are expensive, the coating materials are likely to relatively increase in cost.

Thus, for example, a water-soluble resin-based aqueous coating material such as polyvinyl alcohol (PVA) may be used to form a coat (coating film) on one or both of the sides of the cloth (base fabric) (see Examples 1 to 4 of Patent Document 1, for example).

In this case, the airbag is required to have heat and moisture resistance to exert a coating performance under a heated and humidified condition in a parked vehicle (see Paragraph [0002] of Patent Document 1, for example).

On the other hand, cloths having a relatively low cover factor (K) tend to be used, because weight reduction, cost reduction, etc., have recently been required for the airbag base fabric.

It should be noted that the cover factor (K) is represented by the following formula (1).

$$K = NW \times DW^{0.5} + NF \times DF^{0.5}, \tag{1}$$

where NW represents warp density (threads/in), DW represents warp fineness (denier), NF represents weft density (threads/in), and DF represents weft fineness (denier).

The cover factor (K) being low or high means that the warp and weft densities and/or the warp and weft finenesses are relatively low or high.

In the case of a cloth having a low cover factor, the coating film has been required to have higher heat and moisture resistance as well as higher flexibility (extensibility) than in the past from the viewpoint of the exertion of the above-described performance.

However, in the case of water-soluble resin, improvement in the heat and moisture resistance is basically limited, and furthermore, most are hard and brittle, having been considered to be difficult to meet the requirement above.

Hence, Patent Document 4 proposes, as follows, a water-soluble resin-based airbag base fabric coating material that can form a water-insoluble coat (coating film) having excellent heat and moisture resistance and flexibility on one or both of the sides of a cloth (see claim 1).

"A water-soluble resin-based aqueous airbag base fabric coating material, wherein the water-soluble resin is polyvinyl alcohol (PVA), and wherein aliphatic polyvalent carboxylic acid or polyisocyanate reactive with OH groups of the PVAL is added as a cross-linker and liquid polyol is added as a plasticizer."

In addition, the recent environmental changes (global warming and humidification) have been requiring higher heat and moisture resistance than ever before. For example, in a hot water immersion test for heat and moisture resistance evaluation, improvement in the leaching rate has been required, but it has been difficult for aliphatic polyvalent carboxylic acid for PVA cross-linkage to meet the requirement. Since the bond between PVA and aliphatic polyvalent carboxylic acid is an ester bond, there has been a worry that hydrolysis due to humidification and heating could damage the coating film.

To address this, polyisocyanate such as MDI or HMDI (HDI) that can generate urethane bonds with PVA may be used for PVA cross-linkage (see FIG. 1 of Patent Document 4). However, with polyisocyanate such as MDI or HMDI, it has been difficult for the coating film to have sufficient flexibility, that is, to ensure a sufficient breaking extension ($E_B$). In addition, MDI and HMDI are also reactive (can form a bridge) with water, suffering from a stability problem as a coating material. It should be noted that MDI and HMDI in Patent Document 4 are monomers, both included in a low-molecular-weight form in the present invention.

Further, Patent Document 5 discloses a water-dispersible polyurethane coating material, in which blocked polyisocyanate (B-NCO) is added as an adhesion (adherence) improver to a base fabric. It is also described that the B-NCO may be a medium-molecular-weight form as a polyether-modified prepolymer used in the present invention or a low-molecular-weight form (monomer) (see Paragraphs [0026] to [0028]). However, Patent Document 5 is directed to a water-dispersible polyurethane coating material, the blending ratio of which to the base resin is 0.1 to 3 mass % (see Paragraph [0025]), which is largely different from the blending ratio of 10 to 30 parts to 100 parts of PVA in the examples of the present invention. Further, this document includes no disclosure or indication regarding addition of a low-molecular-weight form in a small amount to the medium-molecular-weight form of the B-NCO for improvement in the adhesion to the base fabric.

Furthermore, to achieve an improvement in the adherence of a cross-linked coat (breathability reducing coating film) to a cloth, Patent Document 6 discloses a coating film configuration using a coating material such as silicon resin (considered to be emulsion-based or solution-based) to partially enclose each filament single yarn of the cloth with the coating material resin (see claim 1 and FIG. 1, for example). This also discloses a coating method for obtaining such a coating film configuration, the method including using resin liquid, the viscosity of the coating material being within the range from 5000 to 20000 cP, and using a doctor knife with an acute-angled edge to set the contact pressure with the cloth 1 to 15 N/cm for coating (see claim 6, for example).

Patent Document 7 also discloses an airbag base fabric, in which a breathability reducing coating film of PA elastomer is fusion-formed on one or both of the sides of a cloth composed of polyamide (PA) fiber yarns (filaments) (see Abstract, for example). The coating material of the coating film is typically emulsion-based or organic solvent-based.

The organic solvent-based coating material is undesirable from an environmental viewpoint, and the coating facility is required to be of explosion-proof specification. For these reasons, the emulsion-based coating material, which is aqueous, is mainstream.

However, employing a conventional coating method (considered a knife coating) using an emulsion-based coating material would result in a coat formed on the surface of the cloth including the cloth interlace portions (seam portions) so that an air shutoff property (breathability reduction) is ensured as shown in FIG. 2 of Patent Document 5, but the coating material has a high viscosity and the resin is less likely to penetrate between single yarns and thereby enclose the single yarns, resulting in a reduction in the adhesion (adherence) between the cloth and the coat (see Paragraph [0015] of Patent Document 6). On the other hand, employing an immersion coating, in which the coating material has a low viscosity, would result in a penetration of the coating material in a manner enclosing almost all the single yarns as shown in FIG. 3 of Patent Document 5, but no resin film is formed on the cloth interlace portions and thus it is difficult to ensure a sufficient air shutoff property (see Paragraph [0015] of Patent Document 6).

It is therefore necessary, as in claim 6 of Patent Document 6, to force resin between single yarns so that the resin encloses each single yarn to ensure adhesion in a knife coating.

It should be noted that in the case of using resin (PA-based) of the same type as the cloth as in Patent Document 7, a fusion (baking) treatment after coating would provide adhesion as well as breathability reduction, but it is necessary to use a coating material based on special resin of the same type and having a specific melting point.

Moreover, the coating film thus forced and formed in the knife coating cannot have a uniform film thickness along the concavo-convex surface of the cloth as shown in FIG. 1 of Patent Document 5 (thickened at the cloth interlace portions). It is therefore conceivable that the amount of resin consumption might relatively increase.

Furthermore, in the case of Patent Document 7, since the coating film flows during fusion bonding, the resin flows into the interlace portions, so that the coating film is formed uniformly along the concavo-convex surface of the cloth as shown in FIG. 1 of Patent Document 7, while it is conceivable that actual coating films are formed with the interlace portions being slightly thickened.

It should be noted that the citation list of the present invention may also include Patent Document 8, though not influential to the patentability of the present invention. Patent Document 8 discloses an airbag base fabric, in which an aqueous emulsion coating material, which is a specific silicon-based processed composition, is added with a thickener to be adjusted to have a viscosity within a predetermined range and applied and hardened on a cloth to form a silicon-based rubber coat (breathability reducing coating film).

PRIOR ART DOCUMENTS

Patent Documents

1. JP 4372297 B
2. JP Hei 7-40798 A
3. JP Hei 8-85405 A
4. WO 2013/047652 A
5. JP 2001-329468 A
6. JP 2004-124321 A
7. JP 2009-097134 A
8. JP Hei 8-85405 A

SUMMARY OF THE INVENTION

In light of the above description, an object of the present invention is to provide a PVA-based airbag base fabric coating material that can meet the requirement of higher heat and moisture resistance (hydrolysis resistance) as well as can form a coat (breathability reducing coating film) not impairing the flexibility of the airbag base fabric on one or both of the sides of a cloth, an airbag base fabric on which a breathability reducing coating film is formed using the coating material, and a method for manufacturing thereof.

Another object of the present invention is to provide a PVA-based airbag base fabric coating material that can form a coating film having excellent breathability reduction and adhesion to a cloth with a relatively small amount of coating material solid content, an airbag base fabric on which a breathability reducing coating film is formed using the coating material, and a method for manufacturing thereof.

An airbag base fabric coating material with the following arrangement according to the present invention solves the above-described problems.

An aspect of the present invention (first invention) is directed to a polyvinyl alcohol (PVA)-based airbag base fabric aqueous coating material, in which blocked polyisocyanate component (hereinafter abbreviated to "B-NCO") and liquid polyol are added, respectively, as a cross-linkage improver and a plasticizer, and in which the B-NCO is composed of or based on a medium-molecular-weight form as a polyether-modified prepolymer, and in which the additive amount of the B-NCO to the PVA is such that the leaching rate in the following hot water immersion test is 10% or lower and the breaking extension ($E_B$) (ASTM D638) is 100% or more.

"Hot water immersion test: a to-be-tested coating material is applied onto a glass plate at a dry film thickness of 100 μm and then heated under a condition of 170 degrees C. and 300 seconds, and the coating film is torn off from the glass plate to prepare a rectangular test piece (50-mm square), which rectangular test piece is then immersed in hot water at 80 degrees C. to measure the leaching rate after 30 minutes according to JIS K7209."

Another aspect of the present invention (second invention) is directed to a polyvinyl alcohol (PVA)-based airbag base fabric aqueous coating material, in which blocked polyisocyanate component (hereinafter abbreviated to "B-NCO") and liquid polyol are added, respectively, as a cross-linkage improver and a plasticizer, and in which the adhesion of the B-NCO to the base fabric is improved through addition of a low-molecular-weight form to a medium-molecular-weight form as an aliphatic polycarbonate-modified prepolymer, and in which the additive amount of the B-NCO to the PVA is such that the leaching rate in the following hot water immersion test is 3% or lower and the breaking extension ($E_B$) (ASTM D638) is 100% or more.

"Hot water immersion test: a to-be-tested coating material is applied onto a glass plate at a dry film thickness of 100 μm and then heated under a condition of 170 degrees C. and 300 seconds, and the coating film is torn off from the glass plate to prepare a rectangular test piece (50-mm square), which rectangular test piece is then immersed in hot water at 80 degrees C. to measure the leaching rate after 30 minutes according to JIS K7209."

DETAILED DESCRIPTION OF THE PREFERRED EMBODIMENTS

Figure 1:
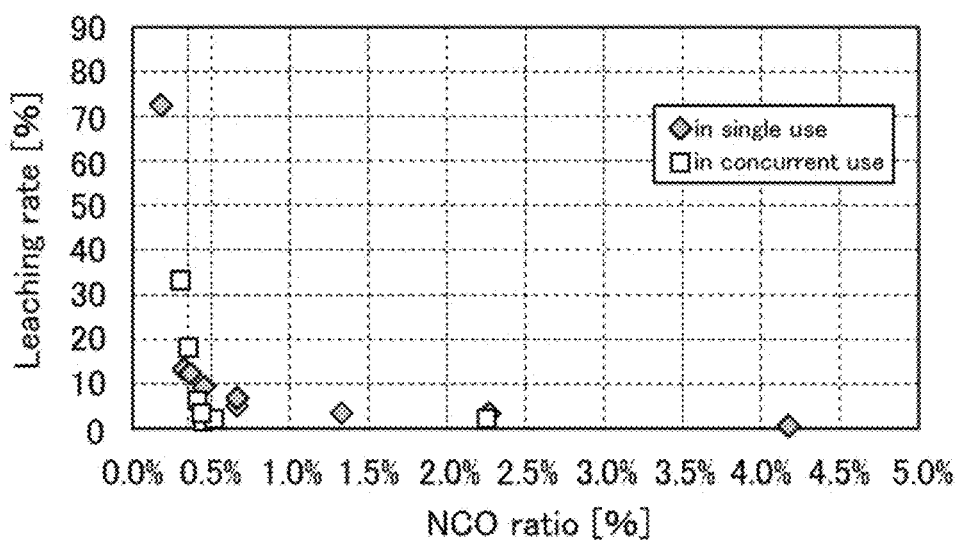
FIG. 1 is a graph summarizing the relationship between the NCO ratio and the hot water leaching rate of a coating film (Tables 1 (A1), 2 (B1, B2, B3), and 3 (C-1 to C-6) when B-NCO in single use of a low-molecular-weight form or a medium-molecular-weight form or in concurrent use of a low-molecular-weight form and a medium-molecular-weight form is added to PVA.

A preferred embodiment of the present invention is described below with reference to the accompanying drawings. However, the invention is not limited to the embodiment disclosed herein. All modifications within the appended claims and equivalents relative thereto are intended to be encompassed in the scope of the claims.

(A) An airbag base fabric coating material according to an aspect of the present invention will hereinafter be described in detail.

The airbag base fabric coating material according to the present invention is a PVA-based aqueous coating material. "PVA-based" here means that the coating material is composed of or based on PVA. It should be noted that resins including OH as a water-solubilizing group that can be combined with PVA may include carboxymethylcellulose.

PVA has an oxygen permeation coefficient smaller than that of polyvinylidene chloride (PVDC), which has excellent gas barrier performance and is heavily used in food packaging. PVA is $6.24 \times 10^{-17}$, while PVDC is $2.76 \times 10^{-13}$ (cc·cm/(cm$^2$·sec·cmHg)) (cited from the Mitsubishi Chemical's website). For this reason, when a PVA-based coating material is applied to an airbag base fabric, even on one side, it is easy to ensure breathability of the airbag base fabric. It should be noted that even double-side application can reduce the coating amount as small as possible.

The PVA used in the present invention preferably has a saponification degree of 70 mol % or higher and a polymerization degree of 1000 to 4000, and further a saponification degree of 80 to 95 mol % and a polymerization degree of 1500 to 3800. If the saponification degree is too low, a required heat and moisture resistance is difficult to ensure for a cross-linked coating film (breathability reducing coating film). On the other hand, if the saponification degree is too high, the crystallinity is also high and thus a required flexibility is difficult to obtain for the cross-linked coating film. In addition, if the polymerization degree is too low, a required strength is difficult to obtain, on the other hand, if the polymerization degree is too high, the viscosity of the coating material is likely to increase, resulting in problems in handling.

More specifically, the PVA may include "JP-33" (polymerization degree (n): 3300, saponification degree: 86.5 to 89.5 mol %, viscosity: 70 to 802 mPa·s), "JP-24" (polymerization degree (n): 2400, saponification degree: 87.0 to 89.0 mol %, viscosity: 40 to 502 mPa·s), an "JP-18" (polymerization degree (n): 1800, saponification degree: 87.0-89.05 mol %, viscosity: 23 to 272 mPa·s) marketed from JAPAN VAM & POVAL CO., LTD. It should be noted that the viscosity is at "4% and 20 degrees C."

(1) Blocked polyisocyanate (B-NCO) is added as a cross-linkage improver to the PVA. The polyisocyanate is blocked from the viewpoint of securing of pot life of the coating material.

Blocking agents for blocking polyisocyanate may include organic compounds, particularly a hydroxyl group containing low-molecular compounds, such as diketoxime, phenol, alcohol, caprolactam, pyrazole, aldoxime, malonic diester, mercaptan, carbazole, triazole, and acetoacetic ester, and inorganic compounds such as sodium hydrogen sulfite and sodium bisulfite.

The B-NCO is composed of or based on a medium-molecular-weight form as a polyether-modified prepolymer.

In the present invention, the medium-molecular-weight form is a prepolymer obtained through reaction between polyether polyol and polyisocyanate (unblocked) of a low-molecular-weight form. Here, the NCO number of the medium-molecular-weight form is typically 2 or 3, though may be 4 or more. The greater the NCO number, the higher the cross-linkage density becomes, so that the flexibility of the cross-linked coating film may be impaired.

The molecular weight of the medium-molecular-weight form is preferably 1500 to 8000, and further 2000 to 6000. If the molecular weight is low, the polyether introduction rate is relatively low and the NCO ratio is high, and thus a required flexibility is difficult to obtain for the coating film. On the other hand, if the molecular weight is high, the NCO ratio is relatively low, and thus a required heat and moisture resistance is difficult to obtain for the coating film, and further the miscibility with the PVA is low and/or the viscosity is high, so that the coating workability may be reduced.

The prepolymer of the medium-molecular-weight form is here polyether-modified because there is no possibility of hydrolysis as in polyester modification. The polyether may include polyethylene glycol, polypropylene glycol, or polytetramethylene glycol.

In the medium-molecular-weight form, the NCO number of isocyanate is 2 or 3, and the NCO ratio after regeneration (before blocking) is adjusted with the introduction amount of polyether molecules. The adjusted NCO ratio is preferably 1 to 6%, and further 1.5 to 4.5%. If the NCO ratio is low, it is necessary to blend a large amount of B-NCO to provide heat and moisture resistance to the coating film. On the other hand, if the NCO ratio is high, it is difficult to provide flexibility to the coating film.

Polyisocyanate (unblocked) of a low-molecular-weight form is used as a raw material for the polyether-modified prepolymer, which may be a monomer aromatic system such as tolylene diisocyanate (TDI), diphenyl methane-4,4'-diisocyanate (MDI), or metaxylylene diisocyanate (XDI), or a monomer non-aromatic system (aliphatic system or alicyclic system) such as hexamethylene diisocyanate (HDI or HMDI), hydrogenated MDI (H-MDI), hydrogenated TDI, or hydrogenated XDI. Furthermore, trivalent or higher polyisocyanate may be used, such as crude MDI, polymeric MDI, TDI trimer (isocyanurate structure), trimethylol propane-1-methyl-2-isocyano-4-carbamate, or diphenyl-2,4,1'-triisocyanate. Among these, one of an aliphatic system or alicyclic system is preferable because it does not have polymer rigidity as in an aromatic system and thus it is easy to ensure flexibility to the coating film. Further, HDI is particularly preferable from the viewpoint of coating material preparation.

Specifically, unblocked polyisocyanate of a low-molecular-weight form may be blocked for use as a raw material for the medium-molecular-weight form.

The additive amount of the medium-molecular-weight form varies slightly depending on the molecular weight and the NCO group number of the unmodified form, the OH group content rate (saponification degree) and the polymerization degree (molecular weight) of the PVA, and the additive amount of plasticizer to be described hereinafter. Typically, the medium-molecular-weight form is 0.5 to 60 parts, preferably 10 to 30 parts, more preferably 15 to 25 parts to 100 parts of the PVA. If the blending amount of the medium-molecular-weight form is small, a required heat and moisture resistance is difficult to provide for the coating film, while if the additive amount is large, the coating film is hardened, so that the flexibility of the base fabric may be impaired.

In the present invention, it is preferable to add further B-NCO of a low-molecular-weight form in a small amount. This makes it easy to ensure adhesion to the cloth (base fabric), that is, peeling strength and crease-flex resistance.

Here, the low-molecular-weight form is a monomer and a homo-oligomer or a co-oligomer of polyisocyanate, and typically means that of a molecular weight of 1000 or lower after regeneration (before blocking). A blocked form of various types of monomer and its homo-oligomer or co-oligomer as a raw material for the medium-molecular-weight form may be used. The low-molecular-weight form preferably has an NCO ratio of 15 to 35%, and further 20 to 30%. If the NCO ratio is low, it is difficult to produce improvement in the heat and moisture resistance and the crease-flex resistance, while if the NCO ratio is high, it is difficult to provide flexibility to the coating film.

The additive amount of the low-molecular-weight form differs depending on the type of the PVA (saponification degree and molecular weight) and the type of the medium-molecular-weight form (NCO ratio). The low-molecular-weight form is preferably 0.3 to 8 parts, and further 0.6 to 4 parts to 100 parts of the PVA. The additive ratio to the medium-molecular-weight form is 0.02 to 0.15 times. As is the case with the NCO ratio, if the additive amount is small, it is difficult to produce improvement in the heat and moisture resistance and the adhesion, while if the additive amount is large, it is difficult to provide flexibility to the coating film.

It is then preferable to add B-NCO such that the NCO ratio is 0.4 to 2.0% and further 0.5 to 1.5% to the total amount of the PVA and the B-NCO (medium-molecular-weight form and low-molecular-weight form) (see Tables 4 and 5 below).

(2) In addition, water-soluble plasticizer is added to the coating material according to the present invention. The plasticizer contains OH groups and is not volatilized at the temperature at which the coating film undergoes a heating treatment. That is, the boiling point is equal to or higher than the heating temperature.

The plasticizer employs one that typically has or is based on multiple OH groups, though may have one OH group.

The following alkylene glycols (the carbon number is 2 to 6), polyalkylene glycols (the carbon number is 2 to 6), trivalent or higher alcohols, and their oligomers (low polymers) with a polymerization degree (n) of 2 to 10 may preferably be included. The number in the following brackets is the carbon number.

The alkylene glycols include ethylene glycol (bp: 197.6 degrees C.) (C2), propylene glycol (bp: 187 degrees C.) (C3), 1,2-butanediol (bp: 193 degrees C.) (C4), 1,3-butanediol (bp: 208 degrees C.) (C4), and hexylene glycol (bp: 198 degrees C.) (C6).

The polyvalent alcohols include glycerin (decomposition temperature: 290 degrees C.) and erythritol (mp: 121 degrees C.).

The polyalkylene glycols include diethylene glycol (n=2, bp: 244 degrees C.) and triethylene glycol (n=3, bp: 287 degrees C.).

The oligomers include polyglycerin (n=2 to 10).

Among these, preferable are ones having a volatility as low as possible, that is, a high boiling point or thermal decomposition point, for example, around 100 degrees C. or more higher than the heating temperature for release of the blocking agent of the B-NCO after application of the coating material to the base fabric. This reduces the amount of volatilization of the plasticizer as small as possible. It should be noted that the heating temperature is 120 to 180 degrees C., as will be described hereinafter.

Particularly preferable are ones structurally having a flexible portion (polyether chain) and a non-terminating OH group on a constituent carbon of the polyether chain, like polyglycerin. They have good compatibility with PVA and can plasticize PVA even in a small amount.

The additive amount of the plasticizer depends on the plasticization efficiency of the plasticizer and varies slightly depending on the saponification degree and the polymerization degree (molecular weight) of the PVA and further the additive amount of the B-NCO.

Alkylene, polyvalent alcohols, and the like, which do not have a high plasticization efficiency, are typically 25 to 150 parts, preferably 30 to 150 parts, more preferably 40 to 100 parts to 100 parts of the PVA.

Polyglycerin and the like, which have a high plasticization efficiency, are typically 0.5 to 25 parts, preferably 1 to 15 parts, more preferably 2 to 5 parts to 100 parts of the PVA. The plasticizer, in an amount as small as possible as long as it is capable of providing plasticity, makes it easier to adjust the viscosity of the coating material with the PVA and to ensure the coating material strength.

If the additive amount of the plasticizer is too small, a required flexibility (mainly extension ($E_B$)) is difficult to provide to the coating film, while if the additive amount is too large, the ratio of the base PVA is relatively low and thus a required strength is difficult to ensure for the coating film.

The aqueous coating material obtained by adding the plasticizer and the cross-linkage improver (B-NCO) to the thus arranged PVA is adjusted, with the PVA, to have an applicable coating viscosity of 1000 to 100000 mPa·s, preferably 2000 to 50000 mPa·s, more preferably 3000 to 30000 mPa·s at a coating temperature. The viscosity range differs correspondingly to the coating method. For example, the viscosity range is adjusted, with the PVA concentration, to be 5000 to 100000 mPa·s and preferably 10000 to 50000 mPa·s for knife coating, while to be 1000 to 13000 mPa·s for immersion coating.

Figure 5A:
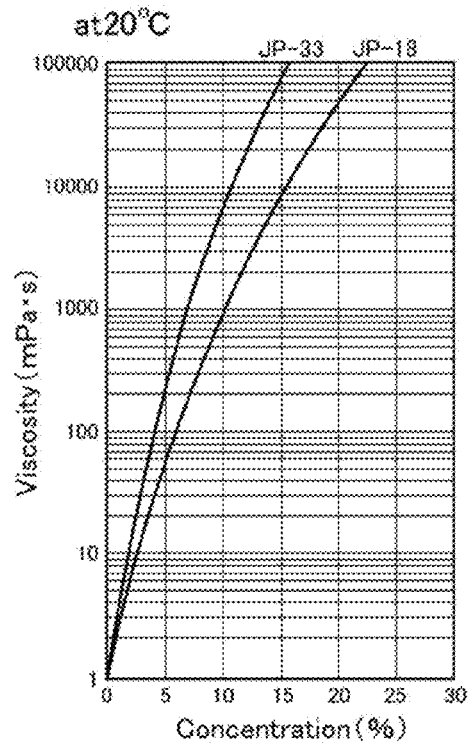
FIG. 5A is a graph showing the relationship between PVA concentration and viscosity of commercially available PVAs "JP33" and "JP18" at 20 degrees C. (cited from the manufacturer's website).
Figure 5B:
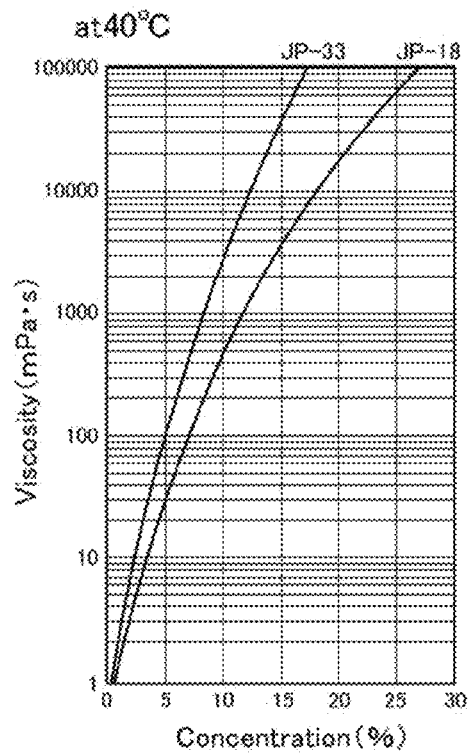
FIG. 5B is a graph showing the relationship between PVA concentration and viscosity of commercially available PVAs "JP33" and "JP18" at 40 degrees C. (cited from the manufacturer's website).

In the case of the "JP-33," for example, at a coating temperature of 20 degrees C., the viscosity is 1000 mPa·s for the concentration of about 7% and 100000 mPa·s for the concentration of about 16% (FIG. 5A), while at 40 degrees C., the viscosity is 1000 mPa·s for the concentration of about 8% and 100000 mPa·s for the concentration of about 17% (FIG. 5B).

In the case of the "JP-18," at a coating temperature of 20 degrees C., the viscosity is 1000 mPa·s for the concentration of about 10% and 100000 mPa·s for the concentration of about 22% (FIG. 5A), while at 40 degrees C., the viscosity is 1000 mPa·s for the concentration of about 12% and 100000 mPa·s for the concentration of about 26% (FIG. 5B).

If the viscosity of the coating material is too low or too high, it is difficult to obtain a cross-linked coating film "formed in a manner following the concavo-convex surface of the cloth and partially enclosing some single yarns on the coating surface" according to the present invention. That is, if the viscosity of the coating material is too low at the coating temperature, the solid content of the coating material penetrates through gaps between seams. It is thus difficult to seal the seams and to ensure flexibility for the cloth because the cross-linked coating film is formed in a manner enclosing almost all the single yarns of each filament. In contrast, if the viscosity of the coating material is too high, the solid content of the coating material hardly penetrates between the single yarns and thus it is difficult to form a uniform coating film even by knife coating.

Here, the concentration of the solid content (concentration of the components of the coating film: PVA+plasticizer+B-NCO) is typically 5 to 50%, preferably 5 to 30%, more preferably 10 to 25%, though varies depending on the type of the plasticizer. If the concentration of the solid content is too low, it is difficult to ensure a coating amount in which breathability reduction can be provided to the cloth, while if the concentration of the solid content is too high, it is difficult to form a cross-linked coating film according to the present invention, following the concavo-convex surface of the cloth and having a film thickness tolerance of ±25% or less.

It should be noted that secondary materials such as an antioxidant, an antirust agent, and/or a flame retardant are added appropriately to the aqueous coating material according to the present invention.

The airbag base fabric to which this embodiment is applied is a cloth composed of polar synthetic fibers such as polyamide (PA) fiber yarns or polyester (PET) fiber yarns.

The PA fibers employ aliphatic polyamides such as nylon 66, nylon 6, nylon 46, and nylon 12, and aromatic polyamides such as aramid.

The base fabric (cloth) is typically plain-woven, though may be twill-woven or sateen-woven.

The cloth also has a cover factor (K), which is represented by the above formula (1), of 1000 to 2700, preferably 1400 to 2100, more preferably 1600 to 2000, most preferably 1800 to 2000. Using a cloth with a low cover factor, that is, a high breathability allows for weight reduction and cost reduction of the airbag. If the cover factor is too low, a predetermined mechanical strength is difficult to obtain and the molten resin penetrates and flows between weave patterns of the cloth, so that it is difficult to ensure an air barrier property or flexibility for the coated base fabric.

If the yarn density and/or the fineness are high, the rigidity of the cloth does not easily fall within a predetermined range, and further if the yarn density is high, the cloth is thickened, being likely to suffer from folding and housing problems of the airbag.

The coating material is then applied onto one or both of the sides of the cloth. The aqueous coating material according to the present invention, which is PVA based, is easy to ensure an air barrier property. It is therefore possible to ensure an air barrier property even by applying the coating material onto only one of the sides of the base fabric. Double-side application allows the film thickness to be as small as possible.

The coating method is not particularly limited. For example, knife coating (die coating), roller coating (national, reverse), brush coating, spray coating, kiss-roll coating, or flow coating (shower coating, curtain coating) may be used for single-side application. Immersion (impregnation) coating, for example, may be used for double-side application. It should be noted that the single-side application may be performed on each side to achieve double-side application.

The coating amount (dry base) is typically 3 to 50 g/m², preferably 6 to 30 g/m², more preferably 8 to 15 g/m², though differs depending on the composition of the coating material and required characteristics (breathability, flexibility, etc.) to the base fabric. The coating film thickness (dry film thickness) is typically 0.5 to 50 μm, preferably 0.5 to 20 μm, more preferably 2 to 10 μm, further more preferably 4 to 7 μm.

Figure 6A:
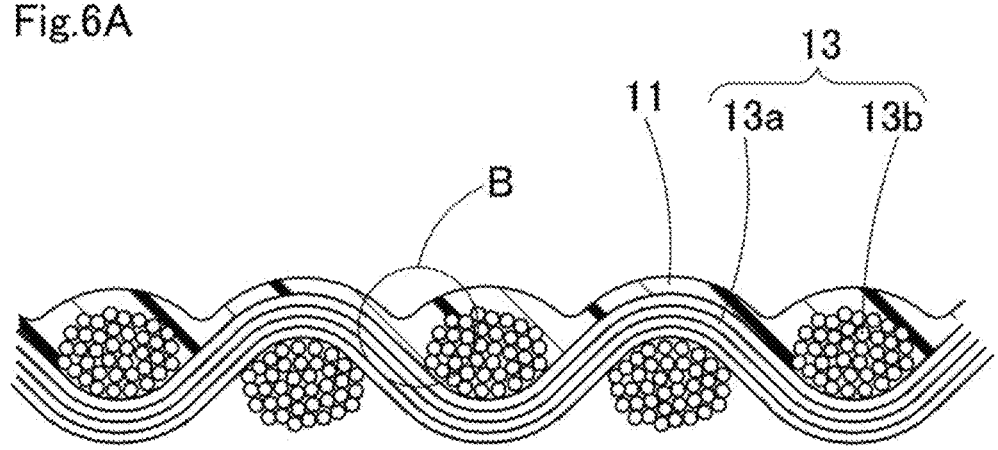
FIG. 6A is a model schematic cross-sectional view of a base fabric according to an example of the present invention.
Figure 6B:
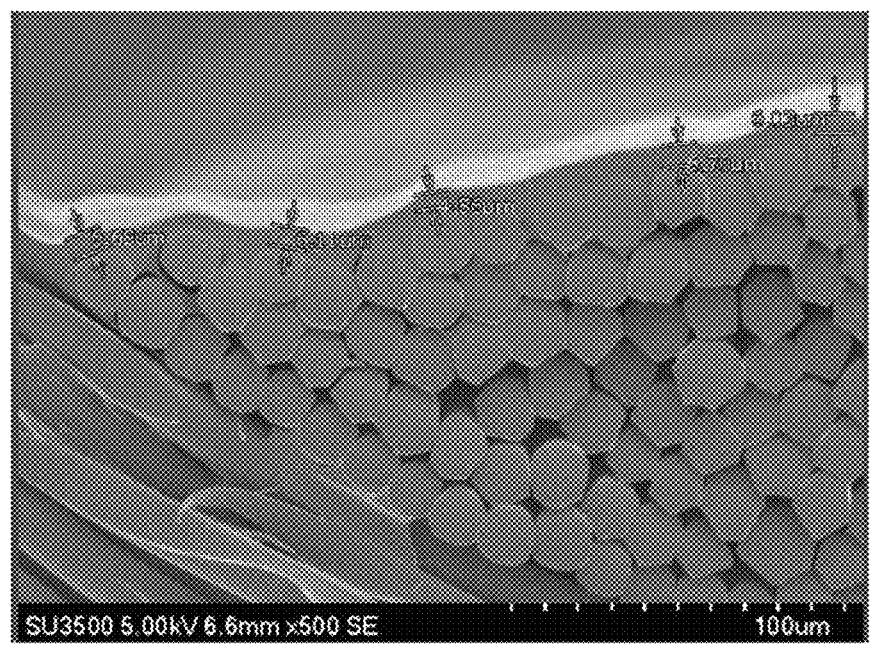
FIG. 6B is a SEM photo of a base fabric according to an application (G1-4) at the B site in the model schematic cross-sectional view.

The thus arranged cross-linked coating film 11 is formed in a manner following the concavo-convex surface of the cloth 13 that is composed of warps 13a and wefts 13b as shown in FIG. 6A and partially enclosing some single yarns on the coating surface as shown in FIG. 6B. The film thickness tolerance is preferably ±40% or less and further ±25% or less of the arithmetic mean value.

Large coating amount or coating film thickness easily leads to weight increase or flexibility reduction of the airbag.

If the film thickness fluctuates widely, the amount of consumption of the coating material increases to ensure breathability reduction and it is difficult to ensure property homogeneity (breathability, flexibility, etc.) of the base fabric.

Here, preferably the breathability is typically 0.1 L/(cm$^2$·min)•or lower, and further 0.05 L/(cm$^2$·min)•or lower at 20 kPa.

After the coating, the blocking agent of the B-NCO is released through a heating treatment to regenerate NCO groups and, at the same time, the PVA and the NCO undergo a dehydration and condensation reaction or an addition reaction to achieve a cross-linkage reaction and a bonding reaction between NCO groups and the plasticizer. Upon this, the evaporation of water is accelerated and thus the solidification of the coating film is also accelerated. In addition, remaining NCO groups of the B-NCO undergo hydrogen bonding to ester bonds and/or amide bonds in the fibers of the base fabric, resulting in an increase in the adhesion.

Heating means is typically a thermostatic chamber (hot air), though may be replaced by or used with other heating means (for example, microwave, infrared, etc.).

After the coating, the heating treatment is then performed at a temperature 10 to 30 degrees C. higher than the temperature for release of the blocking agent of the B-NCO for a time period and at a temperature during which the blocking agent can be completely released and the moisture can be as small as possible. For example, if the blocking agent release temperature is typically 110 to 150 degrees C., the condition is 120 to 180 degrees C. and 30 seconds to 10 minutes. If the heating temperature is too high or the heating time is too long, the base fabric may be degraded.

The thus formed cross-linked coating film preferably has a Young's modulus smaller than that of the cloth and a tensile extension ($E_B$) (tensile breaking extension) (ASTM D638; the same applies hereinafter) of 100% or more, preferably 150% or more, more preferably 200% or more. If the tensile extension is too small, it is difficult to provide flexibility to the airbag base fabric after the formation of the cross-linked coating film (breathability reducing coating film), and peeling of the cross-linked coating film due to stress upon airbag deployment is likely to occur, so that a predetermined air barrier property may be difficult to ensure.

It should be noted that the airbag base fabric according to the present invention, on which the cross-linked coating film is formed, has a bending resistance (Method B) (ASTM-D4032) of 35N or less and preferably 25N or less from the viewpoint of folding etc.

As described heretofore, an airbag base fabric including a water-insoluble cross-linked coat (coating film) having excellent heat and moisture resistance (hot water resistance) and flexibility on one or both of the sides of a cloth can be formed by applying the PVA-based coating material according to the present invention to the airbag base fabric.

(B) Next will be described another aspect of the present invention (second invention). Components and parts common in the above-described present invention are appropriately not described hereinafter.

The airbag base fabric coating material according to the second invention shares commonality with a PVA-based aqueous coating material in which B-NCO as a cross-linkage improver and liquid polyol are added to the PVA. The PVA employed is the same as in the first invention.

The second invention is different from the first invention in that in the arrangement of the first invention in which the adhesion of the B-NCO is improved through addition of the low-molecular-weight form to the medium-molecular-weight form, the polyether-modified prepolymer in the first invention is replaced by an aliphatic polycarbonate-modified one (hereinafter referred to as PC-modified prepolymer) as the B-NCO of the medium-molecular-weight form.

It should be noted that the PC-modified prepolymer (medium-molecular-weight form) is obtained through a reaction between aliphatic polycarbonate polyol (aliphatic PC) and polyisocyanate (unblocked) of a low-molecular-weight form (typically monomer). Specifically, the trade names "WLS210" and "WA213" (marketed from DIC Corporation) and the trade name "UA368T" (marketed from Sanyo Chemical Industries, LTD.) may be included.

Here, the NCO number, molecular weight, NCO ratio of the medium-molecular-weight form and the polyisocyanate of the low-molecular-weight form used are the same as those in the first invention.

The same blocking agent as described above may be used for the low-molecular-weight form, but amines such as pyrazole, caprolactam, triazole, and carbazole are preferably used for the medium-molecular-weight form.

Comparisons of the characteristics of the coating film based on a change of the B-NCO of the medium-molecular-weight form from polyether-modification to PC-modification are as follows.

The examples C-5 (the NCO ratio of the coating material is 0.52%) and G1-6 (0.71%) of the first invention have the same heat and moisture resistance, breaking extension, and adhesion as the corresponding examples B4-1 (0.51%) and B4-2 (0.71%) of the second invention. This indicates that if the NCO ratio of the coating material is close, the characteristics are approximately the same. However, as for the bending resistance indicating the flexibility of the airbag, the example B4-2 of the second invention is 23N, while the corresponding G1-6 of the first invention is 19N, there being an apparent significant difference.

In an extreme crease-flex test (at a load of 14.7N), when the NCO ratio of the coating material is 1.0% or higher, the urethane component increases, resulting in a significant improvement in the adhesion of the coating film.

Further, in the second invention, when the leaching rate and the NCO ratio are around 1%, the leaching rate is maximized (the heat and moisture resistance is minimized), and the leaching rate tends to decrease (the heat and moisture resistance tends to increase) with an increase in the NCO ratio of the coating material (see Table 5).

On the other hand, in the first invention, if the B-NCO of the medium-molecular-weight form is the same, the leaching rate is minimized (the heat and moisture resistance is maximized) when the NCO ratio is around 0.45%. Even when the NCO ratio is higher than that, the leaching rate tends to increase (see Table 3). It should be noted that the leaching rate in this case does not exceed 3% as shown in Table 3, providing a sufficient heat and moisture resistance.

Applied to an airbag base fabric, the coating material according to the second invention, in which PC-modification is employed in the B-NCO of the medium-molecular-weight form, provides a significantly improved coating film adhesion, though having a higher bending resistance, compared to the first invention, as shown in the examples below.

Example 1

Tests and examples conducted to support the advantages of the first invention will hereinafter be described. PVA (water-soluble resin) and polyglycerin (plasticizer) having the following characteristics were used.

PVA: saponification of 87%, viscosity (10 to 12%, 20 degrees C.) of 1300 to 3000 mPa·s Polyglycerin: average molecular weight of 400, viscosity of 100000 cPs, decomposition point of 400 degrees C.

The elemental composition was set as follows.

<Elemental Composition>
PVA: 100 parts
B-NCO: variable
Plasticizer (polyglycerin): 3 parts
Other additives (antioxidant, antirust agent, flame retardant): 1 part
Water: 800 parts Test Example 1

This is a test example with the B-NCO of a low-molecular-weight form in single use under the elemental composition above.

The B-NCO of various low-molecular-weight forms was added to an aqueous solution of PVA in each amount shown in Table 1 to 100 parts of the PVA (solid content) to prepare an aqueous coating material (Test Nos. A1-1, A1-2, and A2-1). Each aqueous coating material was applied onto a glass plate and then heated under a condition of 170 degrees C. and 300 seconds (5.5 minutes), and the cross-linked coating film (100 μm) was torn off from the glass plate to prepare a rectangular test piece (50 mm×50 mm).

The leaching rate of each test piece was measured according to JIS K7209 after a hot water immersion test (80 degrees C. and 30 minutes) to evaluate the heat and moisture resistance.

Other test pieces were prepared from the cross-linked coating films in the same way to also measure the breaking extension ($E_B$) (ASTM D638).

Referring to Table 1 showing results of the tests, it is recognized that the B-NCO of a low-molecular-weight form in single use shows a leaching rate of 0.4 to 2.6% and provides a sufficient heat and moisture resistance, but $E_B$ is 70%, that is, the flexibility is not sufficient.

TABLE 1

| | | Test No. | | |
|---|---|---|---|---|
| | | A1-1 | A1-2 | A2-1 |
| PVA | | 100 parts | | |
| Blocked isocyanate: low-molecular-weight | Article name | Marketed product A1 | | Marketed product A2 |
| | Aquatic type | Self-emulsification | | Forced emulsification |
| | Solid content | 34% | | 30% |
| | Type | HDI-nurate | | MDI |
| | Bound polyol | None | | None |
| | NCO ratio (after regeneration) | 25% | | 12% |
| | Block structure | Oxime | | Lactam |
| | Additive amount (pure content equivalent) | 10 parts | 20 parts | 10 parts |
| NCO ratio | | 2.27% | 4.17% | 1.09% |
| Heat and moisture resistance | Leaching rate | 2.6% | 4.0% | 8.0% |
| Breaking extension ($E_B$) | | 70% | 70% | 150% |

Test Example 2

This is a test example with the B-NCO of a medium-molecular-weight form in single use.

Under the elemental composition above, the B-NCO of various medium-molecular-weight forms was added in each amount shown in Table 2 to prepare an aqueous coating material (Test Nos. B1-1 to B1-3, B2-1 to B2-4, and B3-1 to B3-3). Test pieces were then prepared from each coating material in the same way as in Test Example 1 to measure the leaching rate and the breaking extension ($E_B$).

Referring to Table 2 showing results of the tests, it is recognized that whenever the NCO ratio is 0.40% or higher, the leaching rate is lower than 10%, providing excellent heat and moisture resistance, and $E_B$ is 180 to 230%, that is, the flexibility is also sufficient.

TABLE 2

| | | Test No. | | | | | | | | | |
|---|---|---|---|---|---|---|---|---|---|---|---|
| | | B1-1 | B1-2 | B1-3 | B2-1 | B2-2 | B2-3 | B2-4 | B3-1 | B3-2 | B3-3 |
| PVA | | 100 parts | | | | | | | | | |
| Blocked isocyanate: medium-molecular-weight | Article name | Marketed product B1 | | | Marketed product B2 | | | | Marketed product B3 | | |
| | Aquatic type | Self-emulsification type (pure content: 15%) | | | Self-emulsification type (pure content: 25%) | | | | Self-emulsification type (pure content: 25%) | | |
| | Type | HDI | | | HDI | | | | HDI | | |
| | Bound polyol | PTMG | | | PPG | | | | PPG | | |
| | NCO ratio (after regeneration) | 4% | | | 2% | | | | 2% | | |
| | Block structure | Sodium bisulfite | | | Oxime | | | | Sodium hydrogensulfite | | |
| | Additive amount (pure content equivalent) | 10 parts | 20 parts | 50 parts | 10 parts | 20 parts | 30 parts | 50 parts | 10 parts | 20 parts | 30 parts |
| NCO ratio | | 0.36% | 0.67% | 1.33% | 0.18% | 0.33% | 0.46% | 0.67% | 0.18% | 0.33% | 0.46% |
| Heat and moisture resistance | Leaching rate | 12.0% | 4.4% | 3.0% | 72.2% | 12.8% | 8.8% | 6.1% | 42.1% | 13.2% | 8.0% |
| Breaking extension ($E_B$) | | 230% | 180% | 200% | 200% | 210% | 230% | 230% | 210% | 220% | 230% |

Test Example 3

This is a test example with the B-NCO of a medium-molecular-weight form (marketed product B3) and a low-molecular-weight form (marketed product A1) in concurrent use.

Under the elemental composition above, the medium-molecular-weight form and the low-molecular-weight form were combined and added in each amount shown in Table 3 to prepare each aqueous coating material (Test Nos. C-1 to C-7). Test pieces were then prepared from each coating material in the same way as in Test Example 1 to measure the leaching rate and the breaking extension ($E_B$).

Referring to Table 3 showing results of the tests, it is recognized that whenever the NCO ratio is 0.4% or higher, the leaching rate is lower than 6%, providing excellent heat and moisture resistance, and $E_B$ is 120 to 230%, that is, the flexibility is also sufficient.

TABLE 3

|  |  | Test No. | | | | | | |
| --- | --- | --- | --- | --- | --- | --- | --- | --- |
|  |  | C-1 | C-2 | C-3 | C-4 | C-5 | C-6 | C-7 |
| PVA |  | 100 parts | | | | | | |
| Blocked isocyanate | Marketed product B3 (medium-molecular-weight) |  |  | 18 parts | | | | 13 parts |
|  | Marketed product A1 (low-molecular-weight) | 0 parts | 0.25 parts | 0.5 parts | 0.75 parts | 1.0 part | 10 parts | 1.0 part |
| NCO ratio |  | 0.31% | 0.36% | 0.41% | 0.46% | 0.52% | 2.26% | 0.45% |
| Heat and moisture resistance | Leaching rate | 32.9% | 17.3% | 5.4% | 0.9% | 1.2% | 1.3% | 2.4% |
| Breaking extension ($E_B$) |  | 280% | 260% | 230% | 220% | 220% | 120% | 230% |

The relationship between the leaching rate and the NCO ratio in Test Examples 1 to 3 is shown in FIG. 1. Referring to FIG. 1, it is recognized that regardless of single use or concurrent use, when the NCO ratio is approximately 0.4% or higher to the total amount of 100 parts of the PVA and the additive amount of the B-NCO, a coating film with a low leaching rate after a hot water immersion test can be obtained stably.

Test Example 4

This is a test example for verification of the viscosity stability and the coating film stability during storage.

The aqueous coating material of Test No. C-5 was stored at an ambient temperature of 25 or 40 degrees C. for 672 hours (4 weeks) and, after each time period had elapsed, the viscosity and the coating film extension were measured. It should be noted that the viscosity was measured using a B-type viscometer. The coating film extension was measured with the above-described method.

Figure 2:
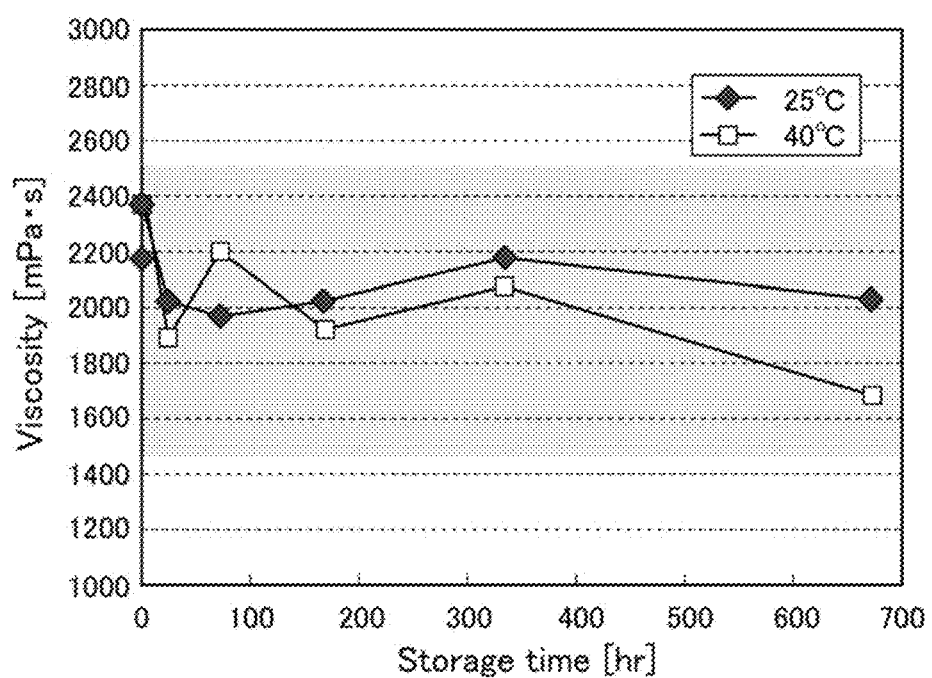
FIG. 2 is a graph showing test results of coating material storage time (at 25 or 40 degrees C.) vs. viscosity change.
Figure 3:
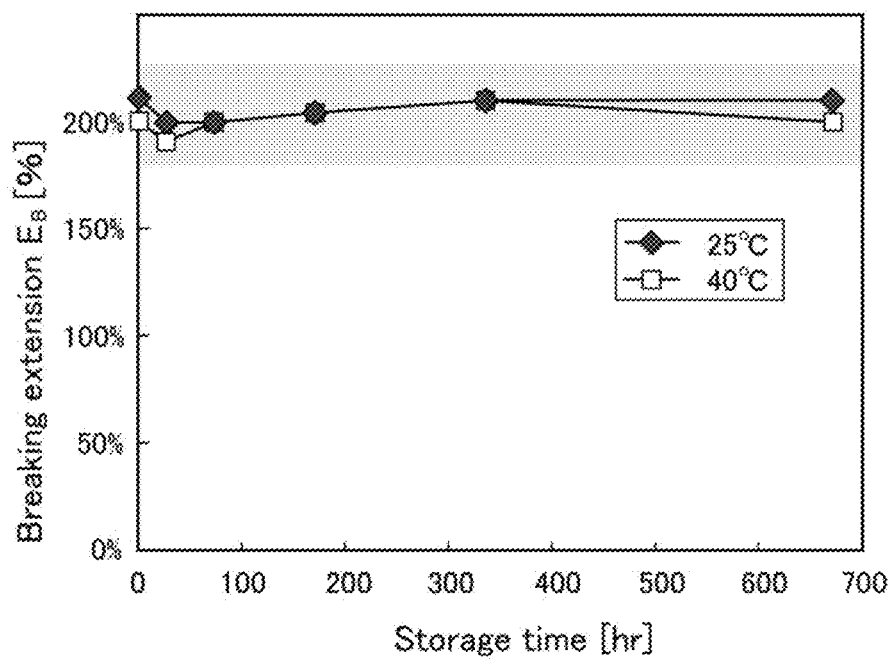
FIG. 3 is a graph showing test results of coating material storage time (at 25 or 40 degrees C.) vs. film property change.

Results of the tests are shown in FIGS. 2 and 3. Referring to these figures, it is recognized that the aqueous coating material according to the present invention has excellent storage stability (a long pot life).

Test Example 5

This is a test example for comparison of the swelling resistance of a cross-linked coating film of the aqueous coating material according to the present invention to that of polyvalent carboxylic acid (citric acid)-based cross-linkage.

In Test Example 5, the aqueous coating material of Test No. C-5 and a citric acid cross-linked coating material of the following blending composition were used.

<Blending Composition>
PVA: 100 parts
Citric acid: 4 parts
Plasticizer (liquid polyethylene glycol): 30 parts
Other additives (antioxidant, antirust agent, flame retardant, etc.): 1 part
Water: 800 parts Each coating material was applied onto a glass plate to prepare a test piece (50-mm square×100 μm) in the same way as described above. Each test piece was put into a pressurized bottle with 100 degrees C. hot water held therein and, after each time period had elapsed, the degree of swelling was measured according to JIS K7209.

Figure 4:
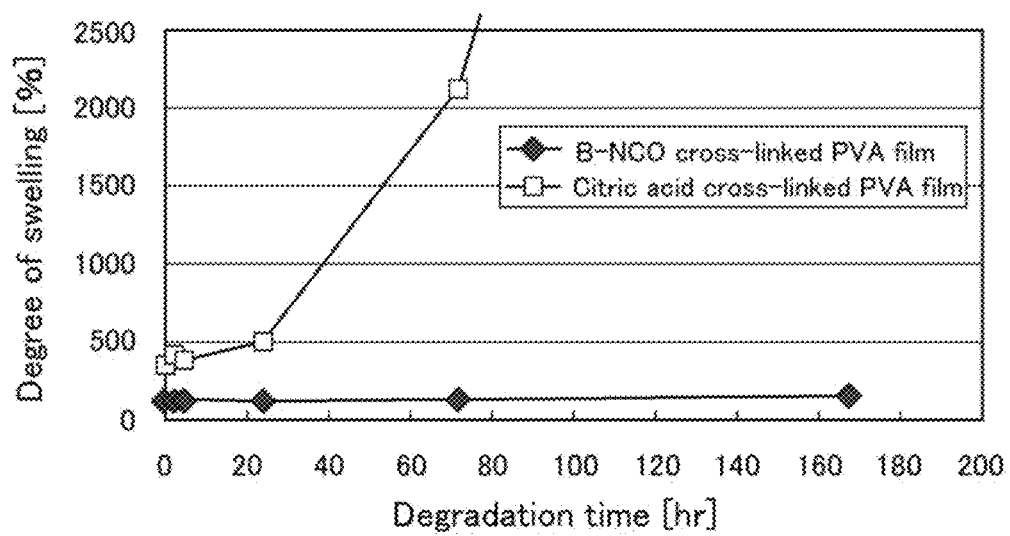
FIG. 4 is a graph showing test results of degradation time vs. degree of swelling in hydrolysis accelerating tests for a B-NCO or citric acid cross-linked PVA film.

Referring to FIG. 4 showing results of the tests, it is recognized that the aqueous coating material according to the present invention shows no change in the degree of cross-linkage (degree of swelling), while the citric acid cross-linked coating material shows a rapid increase in the degree of swelling. It is conceivable from this that the citric acid cross-linked coating material was undergoing hydrolysis.

Applicative Test Example 1

This is an applicative test example for crease-flex test-based adhesion determination for base fabrics applied with aqueous coating materials prepared by adding various amounts of a low-molecular-weight form to a medium-molecular-weight form.

Under the elemental composition above, the B-NCO of a medium-molecular-weight form and a low-molecular-weight form was added in each amount shown in Table 4 to prepare an aqueous coating material (G1-1 to G1-6). Each aqueous coating material was applied by knife coating onto one of the sides of a PET cloth (plain-woven at 560 dtex, 43 drives, and cover factor of 1930) (test piece: 130 mm×120 mm) (solid content coating amount of 15 g/m² and coating film thickness of 5 μm).

Each PET cloth underwent a crease-flex test (JIS K6404 "Testing methods for rubber- or plastic-coated fabrics—Part 6"), and the peeling state of each coating film was determined visually.

Results of the tests are shown in Table 4, together with results of concurrently measured breaking extension ($E_B$). Referring to Table 4, it is recognized that when the NCO ratio is 0.4% or higher and, in particular, 0.5% or higher, the crease-flex resistance (adhesion) is sufficient.

As for the coating material of Test No. G1-4, the base fabric underwent a cross-sectional observation with a scanning electron microscope (SEM), the photo of which is shown in FIG. 6B. Referring to the SEM photo, it is recognized that the film thickness tolerance is ±25% or less to the set film thickness of 6 μm. That is, the average film thickness of 6.07 μm is +11.0% to the maximum film thickness of 6.70 μm and −20% to the minimum film thickness of 4.86 μm.

Example 2

The following is a test example conducted to support the advantages of the second invention.

Applicative Test Example 2

Under the following elemental composition, the B-NCO of a medium-molecular-weight form and a low-molecular-weight form was added in each amount shown in Table 5 to prepare an aqueous coating material (B4-1 to B4-7). It should be noted that PVA and polyglycerin used was the same as above.

<Blending Composition>
PVA: 100 parts
B-NCO (medium-molecular-weight form): variable
B-NCO (low-molecular-weight form): 1 part
Plasticizer (polyglycerin): 5 parts
Other additives (antioxidant, antirust agent, flame retardant, etc.): 1 part
Water: 800 parts Each aqueous coating material was applied by knife coating onto one of the sides of a PET cloth (plain-woven at 560 dtex, 43 drives, and cover factor of 1930) (test piece: 130 mm×120 mm) (solid content coating amount of 15 g/m² and coating film thickness of 5 μm).

TABLE 4

| | | Test No. | | | | | |
| --- | --- | --- | --- | --- | --- | --- | --- |
| | | G1-1 | G1-2 | G1-3 | G1-4 | G1-5 | G1-6 |
| PVA | | | | | 100 parts | | |
| Blocked isocyanate | Marketed product B3 (medium-molecular-weight) | 0 parts | 9 parts | 13 parts | 18 parts | 27 parts | 36 parts |
| | Marketed product A1 (low-molecular-weight) | | | | 1 part | | |
| NCO ratio | | 0.12% | 0.39% | 0.44% | 0.51% | 0.62% | 0.71% |
| Breaking extension ($E_B$) | | 250% | 240% | 230% | 220% | 210% | 200% |
| Crease-flex test (coating film state) | | Peeled | Peeled | Floated | Not floated | Not floated | Not floated |

Further, as for Test No. G1-6, the PET base fabric (airbag base fabric) with the cross-linked coat applied on one side thereof underwent a measurement of the bending resistance (Method B), a breathability test (method in house) and a crease-flex test (9.8N, 500 cycles).

As a result, the bending resistance was 19N, the breathability (air barrier property) was 0.03 L/(cm²·min), and result of the crease-flex test (adhesion) was "not floated" after 500 cycles. It is thus recognized that applied to a cloth (base fabric), the coating film according to the present invention cannot impair the flexibility (the target value is 25N or less) and can provide an excellent air barrier property (the target value is 0.05 L/(cm²·min)) and adhesion (the target value is "not floated" after 300 cycles).

Each PET cloth then underwent a crease-flex test (JIS K6404 "Testing methods for rubber- or plastic-coated fabrics—Part 6") under the following conditions, and it was determined visually whether or not the coating film was floated and/or peeled.

Crease-flex test: 9.8N and 500 cycles (the same as Applicative Test Example 1)

Extreme crease-flex test: 14.7N and 500 cycles

Results of the tests are shown in Table 5, together with results of concurrently measured bending resistance. It is recognized that when the NCO ratio is 1.0% or higher, the crease-flex resistance (adhesion) is provided even in the extreme crease-flex test at a load of 14.7N. It should be noted that the extreme crease-flex test has stringent specifications (conditions) in view of the inflator output, environmental conditions, and the like for the way the airbag will be used in the future, though not required in the current standards.

improving adhesion of the B-NCO to the base fabric in addition to the medium-molecular-weight form of B-NCO.

TABLE 5

| | | Test No. | | | | | | |
|---|---|---|---|---|---|---|---|---|
| | | B4-1 | B4-2 | B4-3 | B4-4 | B2-5 | B4-6 | B4-7 |
| PVA | | 100 parts | | | | | | |
| Blocked isocyanate: medium-molecular-weight | Article name | Marketed product B4 | | | | | | |
| | Aquatic type | Self-emulsification type (pure content: 25%) | | | | | | |
| | Type | HDI | | | | | | |
| | Bound polyol | Polycarbonate (PC)-based | | | | | | |
| | NCO ratio (after regeneration) | 2% | | | | | | |
| | Block structure | Amines | | | | | | |
| | Additive amount (pure content equivalent) | 18 parts | 36 parts | 50 parts | 100 parts | 125 parts | 170 parts | 200 parts |
| Ditto: low-molecular-weight | Article name | Marketed product A1 | | | | | | |
| | Additive amount (pure content equivalent) | 1 part | | | | | | |
| Coating material NCO ratio | | 0.51% | 0.71% | 0.83% | 1.12% | 1.21% | 1.31% | 1.40% |
| Heat and moisture resistance | Leaching rate | 1.2% | 0.8% | 1.1% | 1.0% | 0.8% | 0.8% | 0.5% |
| Breaking extension ($E_B$) | | 220% | 200% | 220% | 240% | 280% | 360% | 380% |
| Product bending resistance | | 19N | 23N | 26N | 28N | 29N | 30N | 32N |
| Crease-flex test | | ○ | ○ | ○ | ○ | ○ | ○ | ○ |
| Extreme crease-flex test | | x | x | x | ○ | ○ | ○ | ○ |

Evaluation criteria . . . ○: Neither floating nor peeling, x: Floating or peeling

What is claimed is:

1. A polyvinyl alcohol-based airbag base fabric aqueous coating material, which comprises polyvinyl alcohol (PVA) to which
blocked polyisocyanate component (hereinafter abbreviated to "B-NCO") and liquid polyol are added, respectively, as a cross-linkage improver and a plasticizer,
the B-NCO being composed of or based on a mixture of a medium-molecular-weight form of a polyether-modified prepolymer and a low-molecular-weight form of a monomer and a homo-oligomer or a co-oligomer of polyisocyanate, the medium-molecular-weight form having a molecular weight of 1500 to 8000, and the low-molecular-weight form having a molecular weight of 1000 or lower, wherein
the additive amount of the medium-molecular-weight form of B-NCO added to the PVA is effective for providing a leaching rate in a hot water immersion test as defined below of 10% or lower and the breaking extension ($E_B$) measured by ASTM D638 is 100% or more,
the hot water immersion test is: a to-be-tested coating material is applied onto a glass plate at a dry film thickness of 100 μm and then heated under a condition of 170 degrees C. and 300 seconds, and the coating film is torn off from the glass plate to prepare a rectangular test piece having a size of 50 mm² and then immersing the rectangular test piece in hot water at 80 degrees C. to measure the leaching rate after 30 minutes according to JIS K7209, and
the additive amount of the low-molecular-form of B-NCO added to the PVA is effective for further 2. The airbag base fabric coating material according to claim 1, wherein the B-NCO is added at a isocyanate (NCO) ratio of the medium-molecular-weight form is 1 to 6%, a NCO ratio of the low-molecular-weight form is 15 to 35%, and a NCO ratio to the total amount of the PVA and the B-NCO is 0.4 to 1.5%.

3. The airbag base fabric coating material according to claim 1, wherein
the PVA has a saponification degree of 70 mol % or higher and a polymerization degree of 1000 to 4000, and wherein
the liquid polyol is alkylene glycol having 2-6 carbon atoms, polyalkylene glycol having 2-3 carbon atoms, or glycerin, polyglycerin having 10 or fewer carbon atoms, or a mixture thereof having a boiling point a thermal decomposition point 100 degrees C. or more higher than the heating temperature or release of the blocking agent of the B-NCO.

4. The airbag base fabric coating material according to claim 3, wherein the PVA has a saponification degree of 80 to 95 mol % or higher and a polymerization degree of 1500 to 3800, and wherein the liquid polyol is glycerin, polyglycerin of decamer or lower, or a mixture thereof.

5. The airbag base fabric coating material according to claim 3, having a solid content concentration of 5 to 50% and adjusted, with the PVA, to have a viscosity measured using a JISZ8803, B-type viscometer within the range from 1000 to 100000 mPa·s at a coating temperature.

6. The airbag base fabric coating material according to claim 5, wherein the coating temperature is set within the range from 20 to 40 degrees C.

7. An airbag base fabric comprising a water-insoluble cross-linked coating film formed of the airbag base fabric coating material according to claim 1 on one or both of the sides of a cloth composed of polar synthetic fibers.

8. The airbag base fabric according to claim 7, which comprises the cross-linked coating film, having a bending resistance measured by ASTM-D4032 of 35 N or less.

9. The airbag base fabric according to claim 8, wherein
the cloth is formed of polyester fibers and has a cover factor $(K)=NW\times DW^{0.5}+NF\times DF^{0.5}$ set within the range from 1000 to 2700,
wherein NW represents warp density in threads per inch, DW represents warp fineness in denier, NF represents weft density in threads per inch, and DF represents weft fineness in denier, and wherein
the cross-linked coating film has a Young's modulus set smaller than that of the cloth,
the airbag base fabric having a breathability of 0.1 L/min·cm$^2$ or lower at 20 kPa and showing 300 cycles or more at 9.8 N in a crease-flex test according to JIS K6404 "Testing methods for rubber- or plastic-coated fabrics—Part 6".

10. An airbag base fabric, wherein a cross-linked coating film formed of the airbag base fabric coating material according to claim 5 is formed on one or both of the sides of a cloth composed of polar synthetic fibers in a manner following the concavo-convex surface of the cloth and partially enclosing some single yarns on the coating surface.

11. The airbag base fabric according to claim 7, wherein the cross-linked coating film has a film thickness of 2 to 10 μm with a film thickness tolerance of ±40% or less.

12. A method for manufacturing an airbag base fabric, comprising applying by knife coating the airbag base fabric coating material according to claim 1 onto one of the sides of a cloth composed of polar synthetic fibers and regenerating NCO groups through a heating treatment to form a water-insoluble cross-linked coating film.

13. A method for manufacturing an airbag base fabric, comprising applying the airbag base fabric coating material according to claim 1 onto one of the sides of a cloth composed of polar synthetic fibers at a dry application rate adjusted to be 3 to 30 g/m$^2$.

14. A polyvinyl alcohol-based airbag base fabric aqueous coating material, comprising polyvinyl alcohol (PVA) to which
blocked polyisocyanate component (hereinafter abbreviated to "B-NCO") and liquid polyol are added, respectively, as a cross-linkage improver and a plasticizer, wherein
the adhesion of the B-NCO to the base fabric is improved through addition of a mixture of a low-molecular-weight form and a medium-molecular-weight form as an aliphatic polycarbonate-modified prepolymer, the low-molecular-weight form having molecular weight of 1000 or less, and the medium-molecular-weight form having molecular weight of 1500 to 8000,
the additive amount of the B-NCO to the PVA is effective for providing a leaching rate in a hot water immersion test as defined below of 3% or lower and the breaking extension ($E_B$) ASTM D638 is 100% or more, and
the hot water immersion test: a to-be-tested coating material is applied onto a glass plate at a dry film thickness of 100 μm and then heated under a condition of 170 degrees C. and 300 seconds, and the coating film is torn off from the glass plate to prepare a rectangular test piece having a size of 50 mm$^2$ and then immersing the rectangular test piece in hot water at 80 degrees C. to measure the leaching rate after 30 minutes according to JIS K7209.

15. The airbag base fabric coating material according to claim 14, wherein the B-NCO is added at a isocyanate (NCO) ratio of the medium-molecular-weight form is 1 to 6%, a NCO ratio of the low-molecular-weight form is 20 to 30%, and a NCO ratio to the total amount of the PVA and the B-NCO is 0.4 to 1.5%.

16. The airbag base fabric coating material according to claim 14, wherein
the PVA has a saponification degree of 70 mol % or higher and a polymerization degree of 1000 to 4000, and wherein
the liquid polyol is liquid alkylene glycol having 2-6 carbon atoms, polyalkylene glycol having 2-3 carbon atoms, or glycerin, polyglycerin having 10 or fewer carbon atoms, or a mixture thereof having a boiling point or a thermal decomposition point 100 degrees C. or more higher than the heating temperature for release of the blocking agent of the B-NCO.

17. The airbag base fabric coating material according to claim 16, wherein the PVA has a saponification degree of 80 to 95 mol % or higher and a polymerization degree of 1500 to 3800, and wherein the liquid polyol is glycerin, polyglycerin of decamer or lower, or a mixture thereof.

18. The airbag base fabric coating material according to claim 17, having a solid content concentration of 5 to 50% and adjusted, with the PVA, to have a viscosity JISZ8803, B-type viscometer within the range from 1000 to 100000 mPa·s at a coating temperature.

19. The airbag base fabric coating material according to claim 18, wherein the coating temperature is set within the range from 20 to 40 degrees C.

20. An airbag base fabric comprising a water-insoluble cross-linked coating film formed of the airbag base fabric coating material according to claim 14 on one or both of the sides of a cloth composed of polar synthetic fibers.

21. The airbag base fabric according to claim 20, which comprises the cross-linked coating film, having a bending resistance measured by ASTM-D4032 of 35 N or less.

22. The airbag base fabric according to claim 21, wherein
the cloth is formed of polyester fibers and has a cover factor $(K)=NW\times DW^{0.5}+NF\times DF^{0.5}$ set within the range from 1000 to 2700,
wherein NW represents warp density in threads per inch, DW represents wary fineness in denier, NF represents weft density in threads per inch, and DF represents weft fineness in denier, and wherein
the cross-linked coating film has a Young's modulus set smaller than that of the cloth,
the airbag base fabric having a breathability of 0.1 L/min·cm$^2$ or lower at 20 kPa and showing 300 cycles or more at 9.8 N in a crease-flex test according to JIS K6404 "Testing methods for rubber- or plastic-coated fabrics—Part 6".

23. An airbag base fabric, wherein a cross-linked coating film formed of the airbag base fabric coating material according to claim 18 is formed on one or both of the sides of a cloth composed of polar synthetic fibers in a manner following the concavo-convex surface of the cloth and partially enclosing some single yarns on the coating surface.

24. The airbag base fabric according to claim 20, wherein the coating film has a film thickness of 2 to 10 μm with a film thickness tolerance of ±40% or less.

25. A method for manufacturing an airbag base fabric, comprising applying by knife coating the airbag base fabric coating material according to claim 14 onto one of the sides of a cloth composed of polar synthetic fibers and regenerating NCO groups through a heating treatment to form a water-insoluble cross-linked coating film.

26. A method for manufacturing an airbag base fabric, comprising applying the airbag base fabric coating material according to claim 14 onto one of the sides of a cloth composed of polar synthetic fibers at a dry application rate adjusted to be 3 to 30 $g/m^2$.

* * * * *